United States Patent [19]
Dolphin

[11] Patent Number: 5,677,953
[45] Date of Patent: *Oct. 14, 1997

[54] SYSTEM AND METHOD FOR ACCESS CONTROL FOR PORTABLE DATA STORAGE MEDIA

[75] Inventor: Janet L. Dolphin, Milpitas, Calif.

[73] Assignee: Spyrus, Inc., San Jose, Calif.

[*] Notice: The term of this patent shall not extend beyond the expiration date of Pat. No. 5,457,746.

[21] Appl. No.: 485,817

[22] Filed: Jun. 7, 1995

Related U.S. Application Data

[63] Continuation-in-part of Ser. No. 359,347, Dec. 19, 1994, Pat. No. 5,457,746, which is a continuation of Ser. No. 122,005, Sep. 14, 1993, abandoned.

[51] Int. Cl.$^6$ .................................................. H04L 9/00
[52] U.S. Cl. .................... 380/4; 380/3; 380/23; 380/25
[58] Field of Search ..................... 380/4, 23, 25, 380/3

[56] References Cited

U.S. PATENT DOCUMENTS

| | | |
|---|---|---|
| 4,827,508 | 5/1989 | Shear. |
| 4,888,798 | 12/1989 | Earnest. |
| 4,977,594 | 12/1990 | Shear. |
| 5,010,571 | 4/1991 | Katznelson .................. 380/4 |
| 5,050,213 | 9/1991 | Shear. |
| 5,101,571 | 4/1992 | Katznelson. |
| 5,457,746 | 10/1995 | Dolphin .................. 380/4 |

*Primary Examiner*—David C. Cain
*Attorney, Agent, or Firm*—Gray Cary Ware & Freidenrich

[57] ABSTRACT

The system and method of the present invention provides the support of high density removable media, such as CD-ROM or MO, to be used as a distributed media for storing data where access thereto is securely restricted. Through this system and method, the secure periodic distribution of several different sets of data information to the end user is achieved with access control selectively performed by at the user's site through communication with the billing/access center. User billing is based on the purchase of the decryption access codes as indicated by the access code attributes encoded on the media. Access code availability is further controlled by selectively providing for updates of decryption access codes.

66 Claims, 13 Drawing Sheets

| File Name | Sign | Encrypt | Receive | Skip Index | Skip Keywrd | Group |
|---|---|---|---|---|---|---|
| C:\DIR1\DIR2\FILENAMExxx | | | | | | 1 |
| C:\DIR1\DIR2\FILENAMExxx | | | | | | 1 |
| C:\DIR1\DIR2\FILENAMExxx | | x | x | | | 1 |
| C:\DIR1\DIR2\FILENAMExxx | | | | | | 2 |
| C:\DIR1\DIR2\FILENAMExxx | | | | | | 2 |
| C:\DIR1\DIR2\FILENAMExxx | | | | | | 1 |
| C:\DIR1\DIR2\FILENAMExxx | | | | | | 1 |
| C:\DIR1\DIR2\FILENAMExxx | | | | | | 1 |
| C:\DIR1\DIR2\FILENAMExxx | | | | | | 2 |
| C:\DIR1\DIR2\FILENAMExxx | | | | | | 1 |
| C:\DIR1\DIR2\FILENAMExxx | | | | | | 1 |
| C:\DIR1\DIR2\FILENAMExxx | | | | | | 1 |

Key Attributes

- ☐ Consecutive Days Of User Access — 90
- ☐ Key Start Date — 12/22/93
- ☐ Key Expiration Date — 12/22/93
- ☐ Total Minutes Of User Access — 1,000
- ☐ Total Bytes Transferable — 10,000,000
- ☐ Total User Log Ons — 10
- ☐ Total Security Transactions — 500
- ☐ User Defined Transaction

[New Key] [Cancel] [Done]

FIG. 8

| Security Defaults | | |
|---|---|---|
| Default Security Settings | | |
| ☐ Sign  ☐ Encrypt  ☐ Record Level | 69 — ☐ Bypass Index  ☐ Bypass Keywords  ☐ Bypass Directory | Done  Cancel |

Default Key Attributes

| | | |
|---|---|---|
| ☐ Consecutive Days Of User Access | 90 | Days  1 |
| ☐ Key Start Date | 12/22/93 | |
| ☐ Key Expiration Date | 12/22/93 | |
| ☐ Total Minutes Of User Access | 1,000 | Minutes 1 |
| ☐ Total Bytes Transferable | 10,000,000 | Bytes 1 |
| ☐ Total User Log Ons | 10 | |
| ☐ Total Security Transactions | 500 | |

FIG. 9

| MONTH | KEY | SUBSCRIBER ONE | SUBSCRIBER TWO |
|---|---|---|---|
| 1 | $K_A$ | | |
| 2 | $K_B = UK_A$ | 6 MONTHS | |
| 3 | $K_C = K_B = UUK_A$ | | |
| 4 | $K_D = UK_C$ | | 6 MONTHS |
| 5 | $K_E = UK_D$ | | |
| 6 | $K_F = UK_E$ | | |
| 7 | $K_G = UK_F$ | | |
| 8 | $K_H = UK_G$ | | |
| 9 | $K_I = UK_H$ | | |
| 10 | $K_J = UK_I$ | | |
| 11 | $K_K = UK_J$ | | |
| 12 | $K_L = UK_K$ | | | e.g. ONE YEAR SERVICE PERIOD

SYSTEM AND METHOD FOR ACCESS CONTROL FOR PORTABLE DATA STORAGE MEDIA

RELATED APPLICATION

The present application is a continuation-in-part application of U.S. Ser. No. 08/359,347 filed on Dec. 19, 1994 now U.S. Pat. No. 5,457,746, which is a file wrapper continuation application of U.S. Ser. No. 08/122,005, filed on Sep. 14, 1993 now abandoned.

FIELD OF THE INVENTION

The present invention relates to providing access to data stored on a portable data storage unit or access to a remote or local server. More particularly, it relates to a system for delivering encrypted data on a portable data storage unit or server and transmitting an access code from a remote location to decrypt the encrypted data.

BACKGROUND OF THE INVENTION

As advances in data high density storage technology continue to progress, more homes and business are acquiring computer peripherals capable of reading the new forms of portable data storage media. For example, high-density media such as compact disc-read only memory (CD-ROM) is becoming a popular medium for storing advanced forms of electronic information such as textual, visual (video or photographs) and audio information as well as interactive media. CD-ROMs contain enough storage space to hold the equivalent of 250,000 pages of text, 12,000 images, 1.5 hours of video, 500 paperback books or 430 magazines. Moreover, CD-ROM technology supports an extremely cost effective replication feature averaging $0.05 per replicated CD. CD-ROM players can be coupled to television sets or computers so that the user can access textual and visual information as well as audio information stored on a CD-ROM. Moreover, more homes and businesses are linking their computers to on-line services and networks such as the Internet.

It is common practice for most publishers to collect and process their information electronically, that is, on word processors and computers. Their data is maintained in electronic form until it is time to mail it to the subscriber. At that time, the information is printed, subscribers mail labels are attached and the published information is sent via a postal service to the subscriber. Under this system, the costs of printing and delivery are extremely high. Moreover, environmental concerns have necessitated the need to consider paper a critical resource. Accordingly, the need for a new publishing medium has been recognized. For example, see U.S. Pat. Nos. 4,827,508, 4,977,594 and 5,050,213, issued May 2, 1989, Dec. 11, 1990 and Sep. 17, 1991 respectively to Shear.

Subscription services to the home and office through standard postal channels provide subscribers with magazines, trade journals, financial updates and book of the month clubs. These subscription services require the user (subscriber) to pay a fixed amount either in advance or monthly. During the time which the subscription is valid, the publisher continues to mail its information to that subscriber. Moreover, any single user may be the subscriber of a multitude of journals or magazines. It is also likely a single subscriber may hold subscriptions to several magazines published by the same publisher.

Also other types of published or archived information, such as corporate, government, or legal records, are printed on paper for dissemination. When disseminated, such records may inadvertently or intentionally be read by those unauthorized to do so since there is no way to insure that the reader is authorized to access to printed matter. Moreover, since some published corporate or legal information is subject to constant updates which renders the previously published material obsolete, it is preferable but often difficult to purge dated material from circulation.

Again referring to the Shear patents, these systems audit or meter a user's access activity. Because a key to unlock encrypted data is present on the user's hardware, such as a PCMCIA card, the decryption function is inhibited at the user's site in order to prevent unauthorized access to the data. Thus, according to the systems of Shear, access to the information on the portable storage medium, such as a CD-ROM, is available to a user without prior authorization for access. Therefore, there is no way to insure that the reader is authorized to access to the information stored on the CD-ROM prior to the user's access. Furthermore, those systems do not provide a way in which access to out-of-date information can be blocked.

The need for protection of information stored on, for example, CD-ROMs, or one a local or remote server from unauthorized access needs to be satisfied before such a publication distribution system is acceptable to publishers. Security provided at both the publisher's site and subscriber's site is needed to prevent the unauthorized access to data contained on the media. Moreover, valid subscribers need to be protected when their subscription service is terminated.

SUMMARY OF THE INVENTION

There are at least three basic features of the present invention. They include, encryption of data in a particular manner, distribution of the data under a particular distribution scheme and controlling the use of the data through an update scheme. Many benefits are provided by these basic features as will be discussed in detail below.

This invention includes publishing data on a removable or portable media, preferably high density, such as a CD-ROM or a magnetic optical (MO) or one a server which is either remote or local and hereinafter is referred to as a server, or alternatively, where only a CD-ROM is mentioned, it must be taken to mean to also include a server.. Thus, one or more publishers may incorporate several, if not, all of their periodic publications on a single media. The present invention includes partitioning the media according to the different publications into data sets, and then providing a protection, access, and use audit scheme to these data sets. Thus, only validated subscribers are able to gain access to the information stored on the CD-ROM or server.

Another important feature of the present invention is that it provides the publisher the tools to configure and set up data and billing according to the publisher's own choice. At the time they create the media, publishers are provided flexibility in billing to charge subscribers in accordance with the type of information being sold. This flexibility is incorporated into the publishing process.

More specifically, the protection and access scheme of the present invention includes providing the publisher with an encryption tool on, for example, a personalized PCMCIA, or other suitable program storage medium such as a SmartCard or software stored on the user's machine. Under this implementation of the present invention, when the publisher loads a program stored locally, menu driven options appear on the publisher's computer screen which allow the publisher to define the user's or subscriber's access to the publisher's data. The billing options are also known as "attributes," which include, for example, subscription duration. The billing attributes are associated with Key Material Identifiers (KMIDs), which are in essence, indexes or identifying codes for the purpose of correlating billing attributes with access codes. Access code and key are used interchangeably herein. An access code corresponding to a particular segment of data stored on the CD-ROM or server is ultimately downloaded to the subscriber so that they may gain access to the information.

The program stored on the publisher's PCMCIA enables the publisher to encrypt the data so that an access code or key is required to decrypt it. The encrypted or scrambled data along with the KMID is then stored on a portable storage medium or server. Corresponding billing information is also stored in a separate file for the user's review. The CD-ROM is then transferred to the user or the encrypted data is electronically transferred to a server or other data storage unit. The user is also in possession of a PCMCIA, or other suitable storage medium such as SmartCard or software stored on the user's machine has on it software for communicating with the billing/access center and managing downloaded access codes. The user further has available a telephone line or comparable medium such as wireless transmissions, a computer with a modem and peripherals capable of reading the PCMCIA and the CD-ROM or accessing the server.

An application on the user's personal computer enables a menu to appear on the screen of the computer when the user loads the CD-ROM or access the server which contains publisher's data into its reading hardware. The menu lists, for example, the publications available for sale and the billing information. The user then, via the software stored on the PCMCIA card, requests access to one or more of the publications by highlighting or pointing to a publication for sale and then sending the request to the billing/access center. The KMID or identifying index and required billing data, such as a credit or debit card number, is sent to a remote billing station via the telephone line. The billing station, upon credit approval, matches the KMID to the access code and transmits the key and access parameter, e.g. time of subscription purchased, to the user via the telephone line. The key is then installed on the user's PCMCIA card. The user may then access the particular publication which is accessible by that particular access code or key.

BRIEF DESCRIPTION OF THE DRAWINGS

FIG. 8 depicts a screen display of attribute choices available during the publisher's utilization of the present invention;

FIG. 9 depicts a second screen display of security choices available during the publisher's utilization of the present invention;

FIG. 16 is a chart illustrating the cryptographic update feature of the present invention.

DETAILED DESCRIPTION OF THE INVENTION

The system and method of the present invention generally includes two subsystems and submethods. The first part of this discussion will focus upon the two subsystems and how they interrelate in Order to make the whole system. The second part of this discussion which begins below, will concentrate on the implementation of each part of the system.

Figure 1:
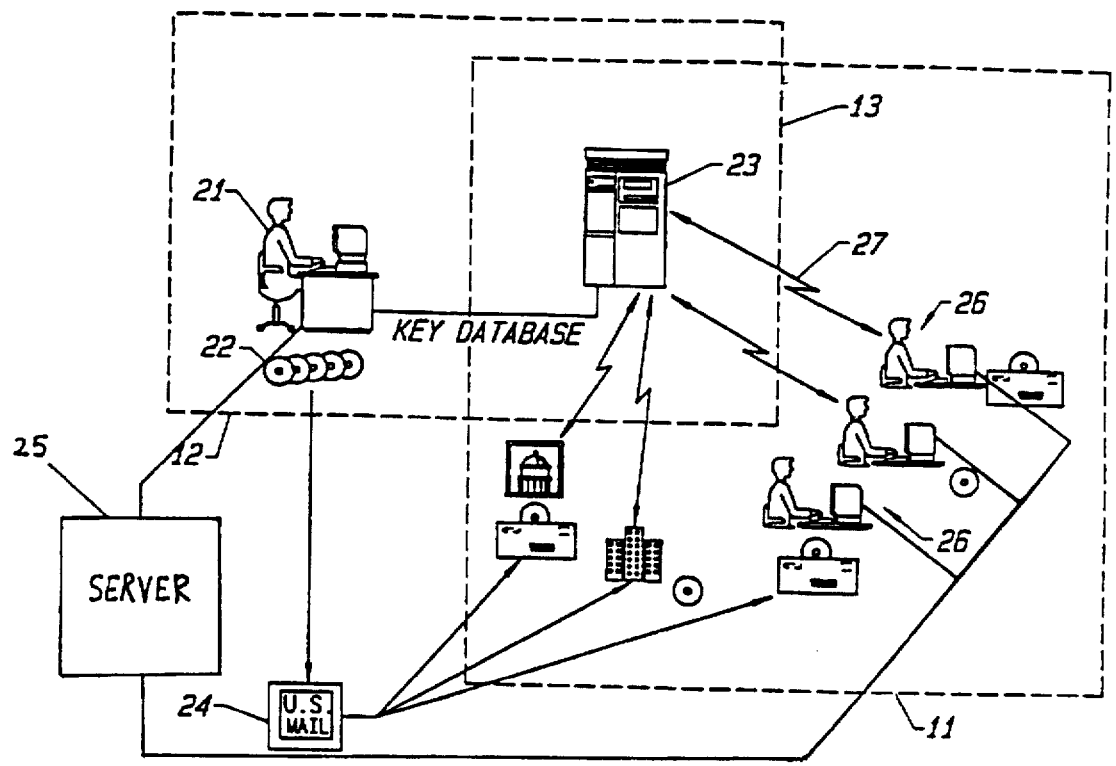
FIG. 1 depicts the overall system of the present invention.

Referring to FIG. 1, box 11 and box 12 are two different portions of the overall system which overlap at box 13. In box 12, the publisher 21 of data is shown. The data can include any type of data which can be stored on a portable storage unit 22 such as, and hereinafter referred to as CD-ROM 22 or a server 25. After the data is generated and before it is stored on the CD-ROM 22 or server 25, it is encrypted or scrambled so that it cannot be accessed without the appropriate access code. Server 25 can provide data stored thereon or provides accessibility via communication with yet another server or any other storage means. The media of distribution therefore can be for example CD-ROM, a bulletin board on the Internet, a floppy disk, a hard drive, electronic mail or any other suitable form. Accordingly, the present invention incorporates standard cryptographic techniques such as symmetric key encryption, digital signature, asymmetric key exchanges, or challenge response. Alternatively, this invention may utilize any non-standard cryptographic techniques.

After the publisher 21 encodes the data, it communicates certain information to billing/access center 23 shown in box 13, as will be discussed in detail below. The publisher 21 stores the encrypted data on the CD-ROM 22 or server 25 and then distributes the data via distribution channels such as the postal service 24. Of course, distribution includes electronic distribution either by wire or in a wireless manner. For example, methods of distribution include Internet, ISDN, X-400, satellite, electronic mail or any other type of electronic distribution, for example those of distribution channels can also include interoffice distribution, for example, in a corporate, government or legal environment among others. Ultimately, the CD-ROM is received by a user 26 or the electronic data is stored in a location accessible to the user under predetermined conditions as discussed below. The user has a computer (which includes a processor) or a television set or monitor with a processor and a CD-ROM reader. The user's computer is equipped with either a software program and/or hardware which is used to communicate with billing/access center 23 and which has a controller to process the data received from billing/access center 23.

When the user 26 loads the CD-ROM 22 into its CD-ROM reader, the user is presented with a menu on the computer or television monitor or screen which indicates what data is stored on the CD-ROM 22. Similarly, when the user accesses data from a server, the user is presented with a menu which indicates what data is accessible on the server. A portion of the data on the CD-ROM 22 or server 25 may not be encrypted so the user can access that portion without an access code. However, at least a portion of the data, according to the present invention, is encrypted. In order for the user to access the encrypted data, the user must obtain an access code or a key to decrypt the encrypted data. In order to obtain an access code, the user 26 communicates with the billing/access center 23 via connection 27, which is a telephone line or other communication apparatus or device, sending a request for a particular access code. Upon authorization, billing/access center 23 downloads or sends to the user 26 via connection 27, an access code to decrypt the data. Of course, user 26 includes any type of user, including for example, an individual, companies or other computer systems.

Figure 2:
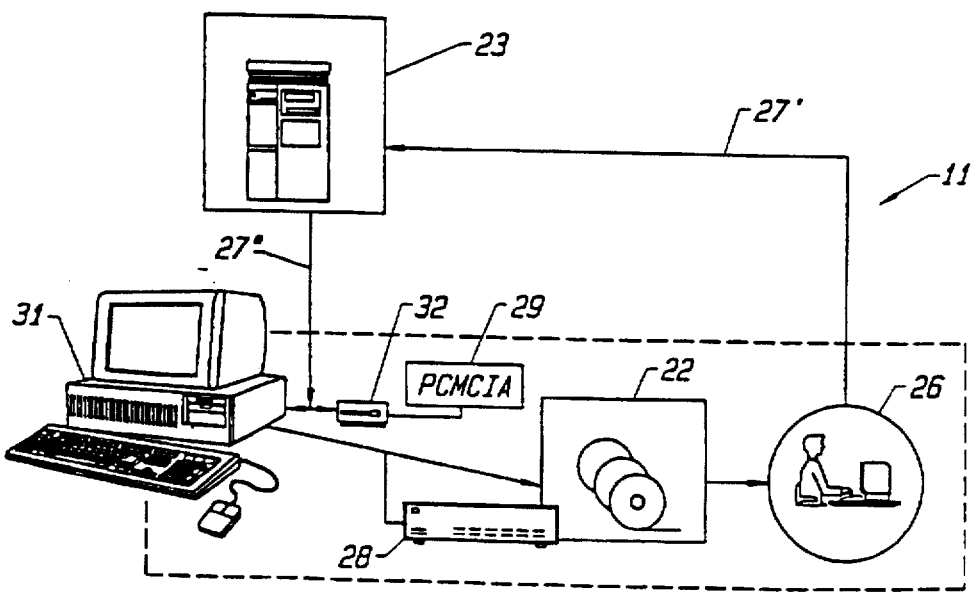
FIG. 2 shows the user/billing station subsystem of Box 11 of FIG. 1.

FIG. 2 shows the user/billing/access center subsystem in more detail. As mentioned above, the user's computer is equipped with either a software program and/or hardware which is used to communicate with billing/access center 23 and which is used control the data received from billing/access center 23. As depicted in FIG. 2, an application to open and provide use "screens" is resident on the machine. Communication is therefore enabled between the PCMCIA card 29 which is loaded into PCMCIA drive 32 and the user operating the computer 31. The PCMCIA card 29 is supplied to user so that the user can provide a request 27' to the billing/access center 23 for an access code to decrypt encrypted data. Upon authorization, billing/access center 23 downloads or sends to the user 26 the access code via connection 27". Connection 27' and 27" can be the same line or transmission means, such including standard electronic mail formats. The access code or key is stored on the user's PCMCIA card 29 for reasons which will become clear below.

Figure 3:
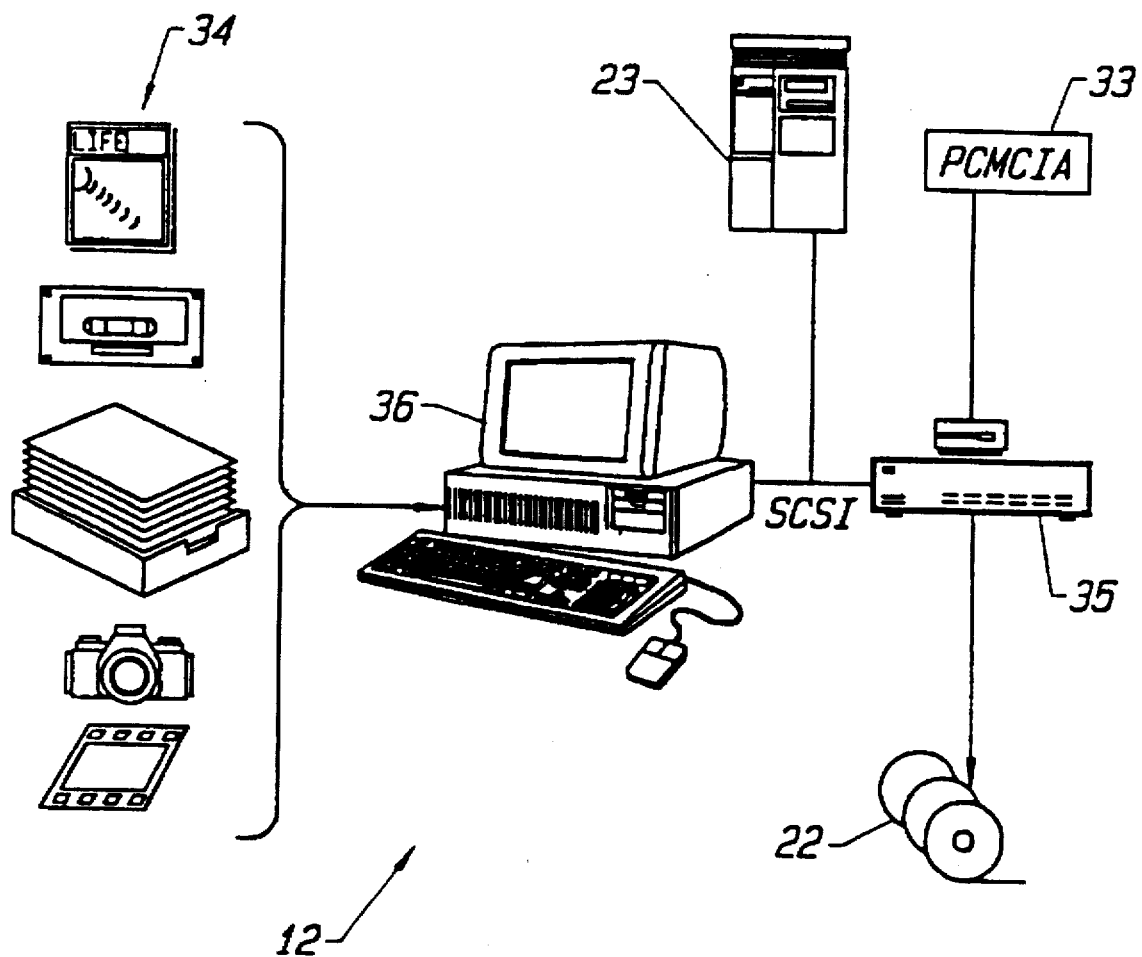
FIG. 3 shows the publisher/billing station subsystem of Box 12 of FIG. 1.

Now referring to FIG. 3, the publisher's station 36 consists of a workstation for organizing and gathering information. A writer device to create CD-ROM 35 or store data on server 25 is in communication with the publishers workstation. The publisher is provided its own publisher PCMCIA card 33 on which a software program is stored in order to allow the publisher to define and control access to the data at the time the information is organized for publication on the CD-ROM. Alternatively, hardware can be provided to the publisher in place of software.

The data 34, as mentioned above can include, for example video, image, photographs, databases including those for banking, sound and software, such of course being in digital form for electronic transmission. The data is either generated on or loaded onto the publisher's computer 36. In accordance with the present invention, before the data is stored on the CD-ROM 22 or the server 25, the publisher determines the billing partitions which are based on like data, e.g. singles magazines, single database, group of similar photographs, modules of executable software and single fonts. The publisher also separates the data into different data sets such as files, sub directories, directories and volumes under different symmetric cryptographic keys so that access to each different segment is only possible with a key which matches that data segment.

The billing partitions are categorized according to how the publisher wants to bill for access to the data. Access control to the data set(s) is therefore controlled via the billing or "attribute" mechanism of the present invention. Attributes are assigned to the data sets by the publisher 21 and are bound to the access code which is hereinafter referred to as the key, such used by the user 26 to decrypt the individual data sets. Each individual symmetric key is then bound to or assigned a unique Key Material Identifier (KMID) which will be described in detail below.

The attributes are defined, implemented and used to determine charges for access to the data encrypted by the user 26 prior to access. One example of an attribute is time duration. For example, one CD-ROM may contain a January issue of a magazine. CD-ROMs issued for months following January may contain subsequent issues of the same magazine. The publisher may wish to offer 1 year, 2 year and 3 years subscriptions, as well as a free 1 month trial subscription. These four different time durations constitute four different attributes. Thus, according to the present invention, a cryptographic update process is applied to allow can be access for fixed periods of time depending on which time duration was chosen by the user. A configuration for an attribute is a data structure of variable length containing flags indicating which metric is present and parameters indicating metric values and units.

Other examples of attributes include "one time buy" attribute where the information is purchased once, and all information protected by that key is available to the subscriber. Also included is an "on demand" attribute where the use of the data is monitored based on a publisher defined parameter including number of times the key can be used, the number of transactions, number of bytes or number of files transferred. Moreover, advertising attributes such are available. For example, a "file bypass" attribute allows the publisher to define files or data sets which are bypassed or are in plain text. Also, a "trial period" attribute allows the user to obtain access to these files for a fixed period of time without a copy or print capability. Applications, such as the trial period, communicates directly with the PCMCIA card to control access to application specific functions, such as copy or print. These applications are modified to support the PCMCIA interface. Furthermore, by a "reduced resolution" attribute, the publisher allows viewing of a particular file without quality resolution. Attributes define access control to the intellectual property stored on the data storage unit and can be according to the user or group of users as the publisher defines. They are also used to define billing or for audit resolution according to time such as a period of time or according to a calendar, in quantities of information such as bytes or in a manner which is user defined. The attributes can be representable by constant values and can also be functions of variables.

After determination of the data partitions by the publisher, and after the publisher defines the attribute to be used with each data set, the attribute is bound with a key and a Key Material Identifier (KMID). The KMID acts as an index or identifying code so that the billing/access center can provide the proper key or access code to open the desired data set. This information is combined by the publisher 21 to create a unique file containing the attribute information for the entire media to be distributed. This information is sent to the billing/access center. The software stored on the PCMCIA card 33 further allows the publisher 21 to encrypt the data and include the attribute and the KMID on the CD or server.

Figure 4:
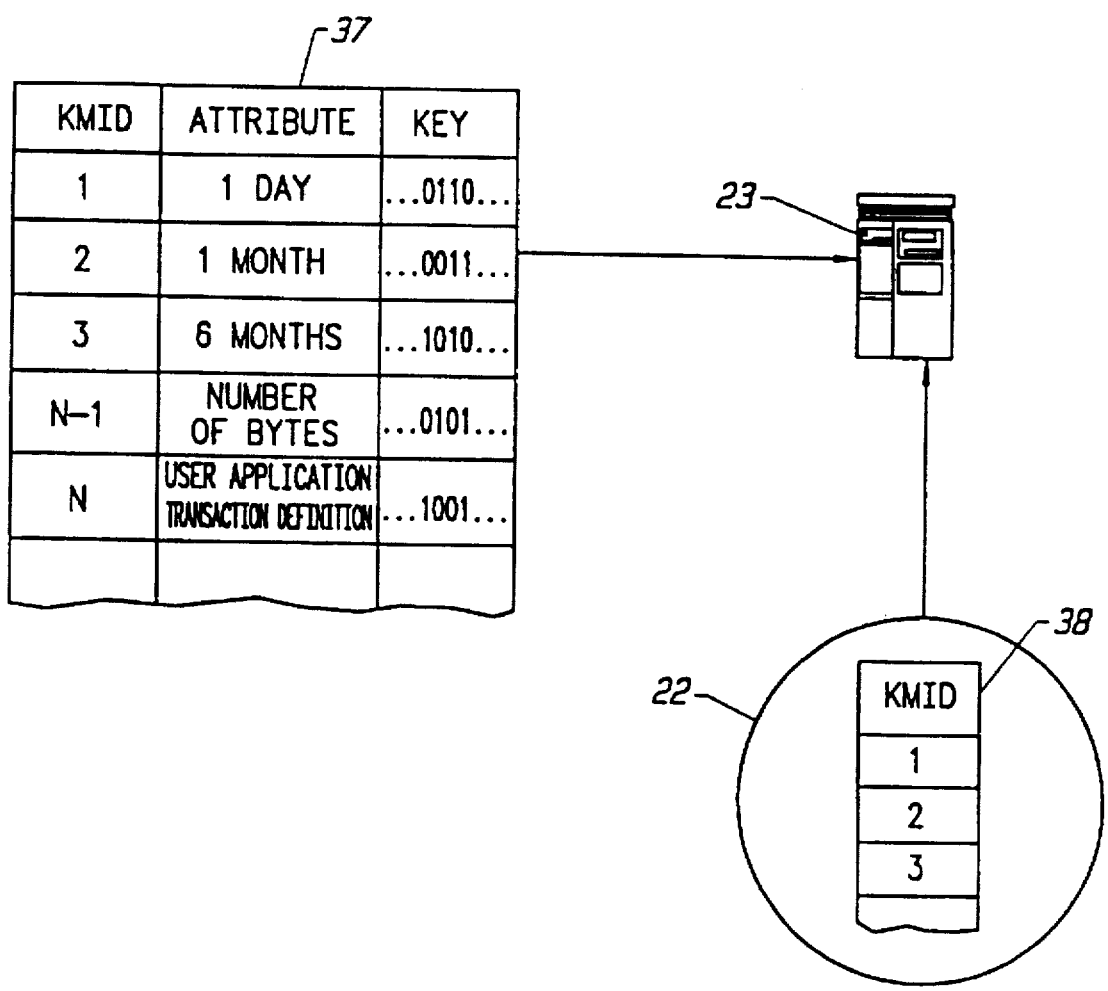
FIG. 4 is a schematic showing the information sent to the billing/access center by the publisher and by the user.

The system of the present invention therefore includes assignment of the key and KMID to a database and the keeping of such information by the billing/access center 23. It further includes the user sending to the billing/access center a particular KMID in order to receive a key to access the desired data. These elements of this system are shown in FIG. 4, where the unique file 37 containing the key, attribute and KMID for each data set is transmitted to the billing/access center 23 which is billing or authorization center 23 by the publisher. This file 37 is downloaded into a central distribution site. Information that needs to be written to the CD-ROM 22 or server 25 is the key start and stop information along with the KMID associated with each particular data set 38. A special "Read-Me" file can be created which allows the subscriber to read information concerning pricing (which match the attributes) for the individual data sets. The "mastered" information is then replicated and distributed by the publisher via any transport method suitable.

Returning to FIG. 2, the user 26 is able to load the CD-ROM into a CD-ROM reader 28 or call up server 25 and read the special "Read-Me" file to see what is available on the portable storage media. When the user 26 has identified a particular data set the user wishes to access, the user 26 uses the PCMCIA card 29 which is loaded into the PCMCIA drive 32 to communicate with the billing/access center, billing/access center 23 a request including the KMID which identifies the desired key via connection 27'. The billing/access center, once having authorized access, downloads via line 27" the key associated with the KMID.

When downloaded, the key may reside on the user's PCMCIA card 29 or on appropriate hardware. The key will access the data set of the instant data storage unit and subsequent data which are distributed in accordance with the limits of the attribute. Therefore, if the attribute indicates a six month time duration as indicated in box 37 and box 38 of FIG. 4, and the first access occurs in January, the user 26 may use the user PCMCIA card 29 through June in order to access the equivalent data set on subsequently distributed CD-ROMs or subsequently stored on the server. After the first use of the key, the subsequent use of the key is maintained and audited by the local user environment, that is, through the user PCMCIA card 29.

In order to provide for limited time duration attributes, the present invention utilizes "key zeroization" (also called "key cancellation") which occurs when an attribute condition is met or can be remotely invoked by the billing/access center. For example, an attribute condition having been met would include the passage of time which is monitorable by a time clock. Since updated data is released periodically, keys are derived from the originally generated key through a cryptographic update process. This feature allows the publisher to distribute its periodic information under a different key which is derived from the last key based on a cryptographic operation. The number of updates valid for a subscriber is encoded in the KMID/attribute information. The cryptographic update process of the present invention is described in detail below and with reference to FIG. 16.

The user's PCMCIA card 29 is used to audit and maintain the count of updates provided by the publisher. Each CD-ROM contains information about the update release of a particular KMID as well as time stamping information used by the user's PCMCIA card 29 for time based key management functions. A clock can also be installed on the PCMCIA card.

The zeroization feature of the present invention provides the advantage that the access of, for example, corporate, government or legal records which are frequently updated can be avoided or stopped. By using a key which zeroizes after one or only a few reviews of the data or after a short time duration, the publisher insures that out-of-date frequently updated records will not be confused with current records.

The user's PCMCIA card 29 is also used to authenticate the subscriber to the billing/access center. Each subscriber is assigned a unique public/private key pair to be used in all transmissions, such being stored on the user's PCMCIA card 29. Different users key pairs or personalities allow the user to sign purchase orders or to make purchase requests with the appropriate personalities. This feature is important in the situation where a single person holds, whether temporary or permanently, several different offices. For example, the president of a company may sign a separate request as a purchasing agent but may sign a separate access request, with different privileges, as president of the company. Accordingly, this invention supports the authentication of different user personalities, as defined by the subscriber, to provide electronic purchase authorizations. Furthermore, each user PCMCIA card 29 contains a unique Pin Phrase to validate the user and their use of the personalities and cryptographic functions of the card at the user's site or through an optional challenge/response system.

When an individual wishes to gain access to files stored on the CD-ROM or server, the key must be resident on the card, that is, already purchased. If not, the subscriber must create a purchase request and send this request to the billing/access center. All requests containing payment methods, e.g. credit card numbers, are encrypted in the public/private key pair. All purchase requests can be also be signed by the appropriate authorizing personality before the billing/access center will process any purchase request.

In the situation where a purchase is not made, that is, where inter-office distribution of CD-ROM to provide corporate, government or legal information in-house, the authentication feature is especially desirable. Unauthorized access to sensitive information is more easily avoided in accordance with the present invention than when information is disseminated on printed media.

To recap, referring to FIG. 1, at the billing/access center 23 the request 27 is received in the form of, for example, electronic mail. The mail is received and the signature is validated to authenticate the source of the request. Included with the mail message is the requested KMID (see FIG. 4). This is then used as a look up index into a large database containing the stored cryptographic keys. Under one embodiment of the present invention, the following steps occur. The billing/access center 23 obtains the publisher defined attributes assigned to the KMID from the database and provides this information to the requester. The requester is then allowed to select a form of payment for the key which is sent to the billing/access center. The billing/access center then validates the payment method and authorization. The KMID and its binded attributes are then sent to the user. At the user's site, the KMID and attributes are loaded onto the user PCMCIA card 29 for control of access and for audit purposes by the card. The user now has access to the purchased information. The KMID and use of the keys according to the publisher's definition is monitored and maintained by the user's PCMCIA card 29. As mentioned above, when an attribute condition is met, e.g. the subscriber has reached the number of purchase bytes or the time has expired, the user's PCMCIA card 29 will automatically zeroize with respect to that publication. Further access by the user will require another call to the billing/access center 23.

The above discussion described in detail general features of the subsystems of present invention and how they relate to one another. The following discussion repeats some of the above discussion with less of an emphasis of the interrelationship of the elements of the present invention, but with more of an emphasis on the components and method steps of the elements of the present invention.

Figure 5:
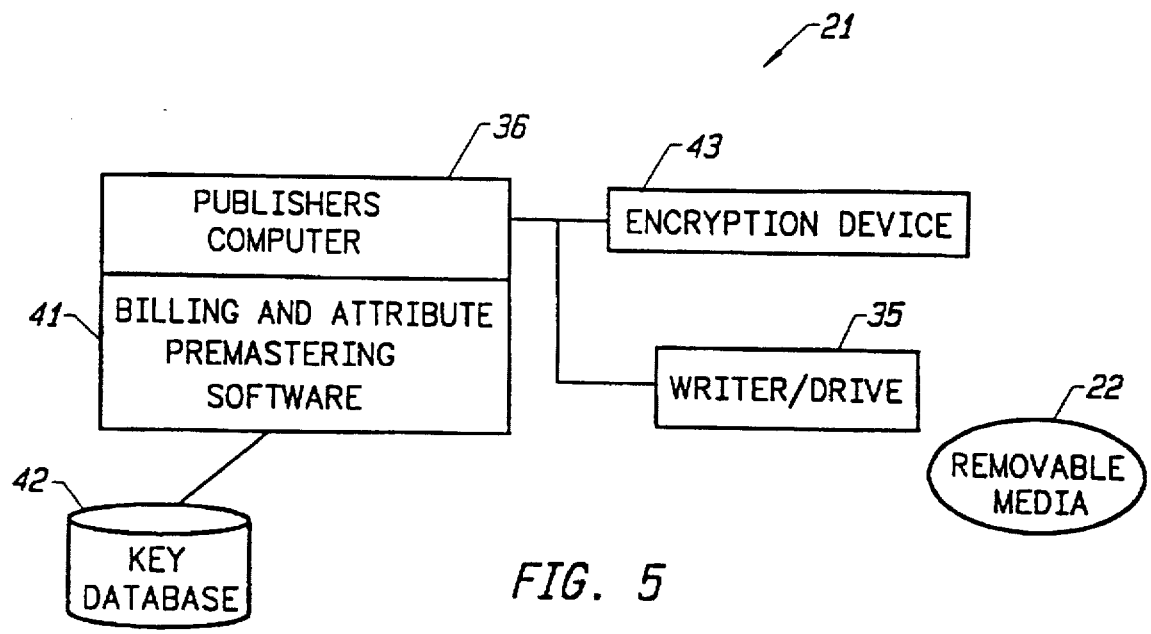
FIG. 5 is a block diagram of some elements of the publisher's station of the present invention.

As discussed above, by logically grouping and categorizing the publisher's information, the publisher can then define the billing and advertising functions associated with the data sets to be published. After the publisher gathers all information that is intended for publication on a particular CD-ROM of series of CD-ROMs or for storage on any type of data storage unit, the information is then be assigned the access and subscription attributes defined by the present invention. A standard publisher's configuration is shown in the block diagram of FIG. 5. There the publisher's workstation 36 is shown on which to gathering and organizing information. The publisher is provided with billing premastering software 41 for such organization wherein the premastering is for the distribution media as discussed above. In communication with the workstation is the CD-ROM writer driver 35 to create the CD-ROM. Finally, the key data base 42 which is stored at publisher's site contains the used keys and their alias', history and current attribute definitions. The key database 42 also contains a list of unused keys which the publisher can use and define the attributes for such unused keys. The keys are generated by a key management center and are preferably random. They are then assigned KMIDs y the key management center. After the publisher defines the use of a particular key, that information is sent to the remote billing/access center 23.

Figure 6:
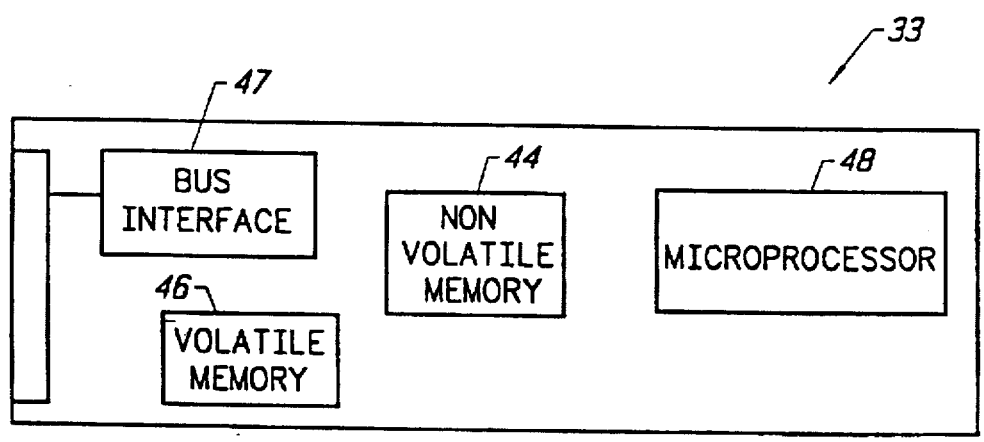
FIG. 6 is a block diagram of the publisher's PCMCIA.

The encryption device 43 is stored on the publisher's PCMCIA card 33 shown in FIG. 6. Each publisher is assigned a unique and personal PCMCIA card 33 which contains, in a FLASH or EEPROM non-volatile memory 44, the publishers personalities and provides audit information about data published and its author. The personalities of the publisher are similar to those of the user as described above. The non-volatile memory 44 further contains the publisher's unique storage variable ($K_s$) used as part of the password algorithm. The non-volatile memory, per key, further stores information relating to purchased keys such as KMIDs, stores use (billing/audit data) and stores access codes. The aforementioned information can be stored on the publisher's PCMCIA card and are encrypted by this local key. Additionally, the publisher's workstation automatically records the CD-ROM identification and KMIDs used to publish a particular CD-ROM. This audit data is stored and maintained by the key data base 42.

The digital signature provided by the PCMCIA card 33 assures the billing/access center and/or the subscriber that the published data was in fact published on the CD-ROM by the authorized publisher of that particular information. This feature avoids piracy of copyrighted material, as well as falsified records in the corporate, government and legal environment.

The audit information stored on the publisher's PCMCIA card 33 is auditable from the billing/access center 23. Since there is a transmission line between the billing/access center and the publisher, the billing/access center can access information stored on the publisher's PCMCIA card 33 to analyze the publisher's activity for many purposes, including improving the system.

The PCMCIA card 33 can be a hardware card or a software application for emulating the hardware card functions. As a standard feature, it contains a volatile memory or RAM 46 and a bus interface 47 so that it may communicate with the publisher's computer system 36.

Before the publisher can actually encrypt and/or sign any information to the CD-ROM, it logs onto the PCMCIA card 33 which supports a logon phrase either through the keyboard interface or one which can be directly input to the card reader. The phrase may be any length or any set of ascii characters the publisher assigns. For enhanced security, the publisher may use biometrics (voice) after the logon phrase for a more secure logon which binds the publisher to the card and its resources. The publisher logs onto the card prior to performing any security related functions.

After logon, the publisher may use the resources of the PCMCIA card 33. The card, whether performed as a software function on the publisher's computer 36 or as a separate hardware card, provides all of the cryptographic functions required by the publisher to generate a CD for supporting an electronic subscription service. The encryption for the CD application is performed at the sector level to support random access on large data bases. The microprocessor 48 operates as the encryption device 43 to allow the publisher to associate files, directories, sub directories, volumes or whole media with a particular symmetric encryption key and is used to execute the encryption. Signature and key exchange algorithms are performed using the public/private key determined by the personality selected. These algorithms are in software for configurability but may also be implemented in hardware on the microprocessor. The microprocessor can be an off the shelf microprocessor. The PCMCIA card 33 operates as a finite state machine. The publisher application is responsible for synchronization of key attribute definitions back to the remote billing/access center.

Figure 7:
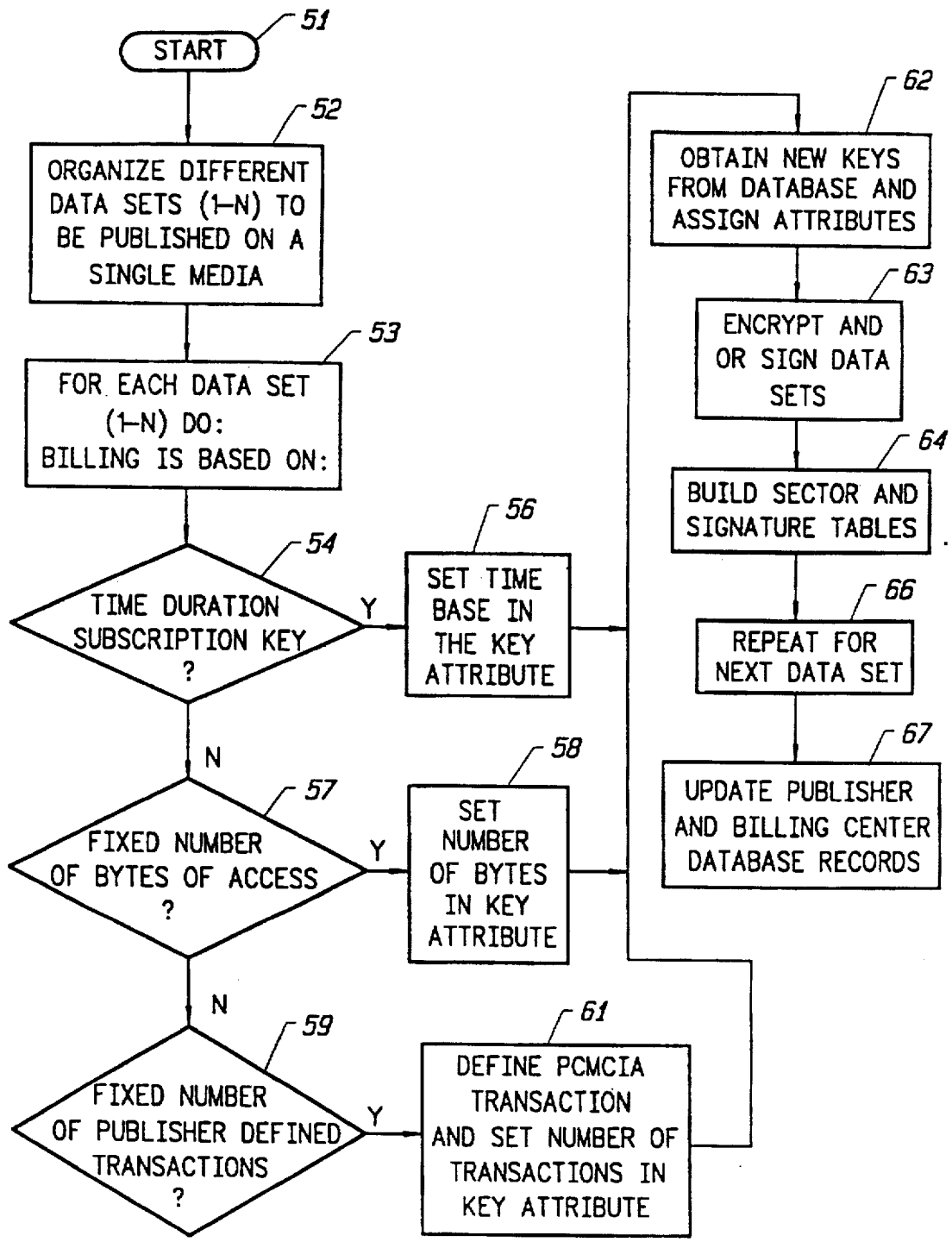
FIG. 7 is a flow chart of publisher's billing software.

The flow chart of FIG. 7 illustrates a series of steps of the present invention, most of which have been described in detail above. After the program starts 51, the data is organized into the data sets to be published on a CD-ROM in step 52. The billing structure for each data set is prepared in step 53. Then, different attributes are associated with the data sets. For example, if time duration is assigned according to decision box 54, the time base is set at step 56 and the attribute is correlated to the data set. Or, the number of bytes of access can be assigned to the data set according to decision box 57, then the number of bytes is set at step 58 and the attribute is correlated to the data set. Or, certain transactions can be defined by the publisher and set according to decision boxes 59 and 61 and then correlated to the data set. After the attributes are created and correlated, new keys are obtained from the key database 42 in step 62. The data is then ready to be encrypted. In step 63 the data is encrypted. In step 64, the key and signature tables are built. In step 66, the entire process is repeated for the next data set. When all of the data has been prepared, step 67 write the key and signature table to the CD and provides for the publisher to update its own records and the billing/access center database records.

FIGS. 8 and 9 are illustrations one of the ways the program is presented to the publisher. This user friendly interface allows the publisher to point, click and drag components for assigning the attributes chosen from the selecter key group of attributes at the bottom of the screen. The file name column represents the intellectual property file format to which the attributes are assigned. The publisher can group similar applications to be encrypted under the same encryption key group 68. If the publisher does not want portions of particular data sets encrypted, the publisher may select bypass step 69 so that any hypertext or key word searches associated with the file will not be encrypted. This is particularly useful if the subscriber wants to determine the number of incidents of a particular word or transaction before buying the data base.

After the publisher determines the key group associates and the level of encryption, the publisher is provided with a second set of menus for defining the billing attributes for the key group. FIG. 9 is an example of the type of interface provided to the user to set security defaults for the key group. These include but are not limited to: consecutive units of user access days, months or years; key start of user defined application turn on date; key expiration; total time of user access minutes, hours, days; total units transferred in bytes, words, or user defined transactions; and total user logons. Key alias can be defined for easier key identification.

These options are available on a new (unused) key or already aliased keys (used). After these attributes are determined by the publisher, the premastering software will update the publisher key database 42 with these parameters. Should the publisher be using an existing alias the publisher has the option to apply a cryptographic update process to this key. The process is defined by using a known fixed constant and mathematically applying this constant (via an exclusive or function) to the old key.

All updates are maintained with a key counter, which are associated with the key. This allows the publisher and subscriber to maintain synchronized keys and update counter which is published monthly with the published material. Subscription access is controlled via the number of updates allowed during the period of time purchased by the subscriber.

The key manager or data base 42 (see FIG. 5) will maintain an audit/history file of the KMIDs used with the individual CD-ROMs created by a publisher. After the CD-ROM is created the key manager 42 will automatically call the publisher's billing/access center and download the configured attribute information.

Figure 10:
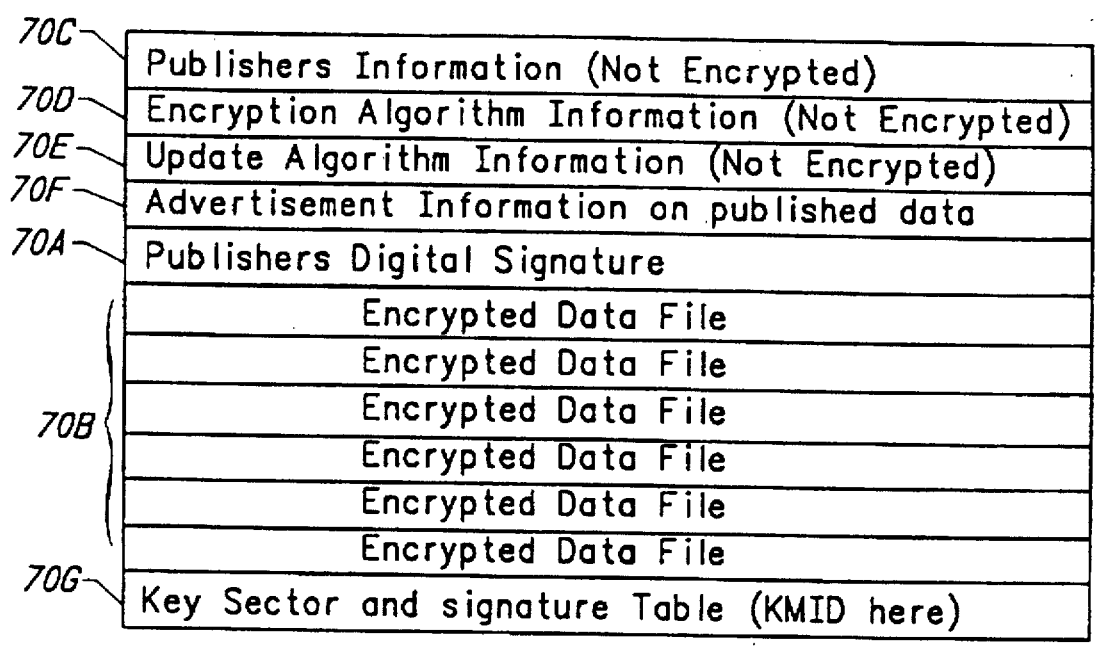
FIG. 10 shows a list of the type of information stored on the removable media of the present invention.

The CD-ROM (or whatever distribution media is utilized in accordance with this invention) contains information about the start and stop information for the associated KMIDs. This information is maintained in a separated table that can be located anywhere on the CD-ROM. FIG. 10 illustrates such a table. The publisher's digital signature file 70a contains signed data files 70b. Other files which have been discussed above including publisher's information 70c, the encryption algorithm information 70d, the update algorithm information 70e, the advertisement information relating to the publishing data 70f, and the key and signature table 70g are also included on the CD-ROM.

The key and signature table 70g contain the information about the KMIDs used in creating this media. Most importantly, this table contains the stop and start information for the KMIDs used.

Figure 11:
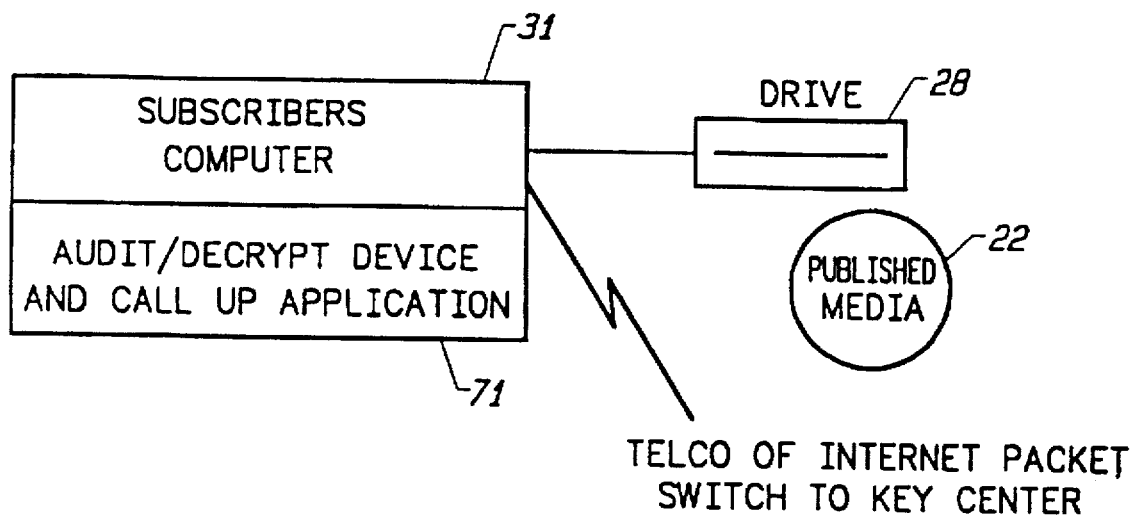
FIG. 11 is a block diagram of some elements of the subscriber's station of the present invention.
Figure 12:
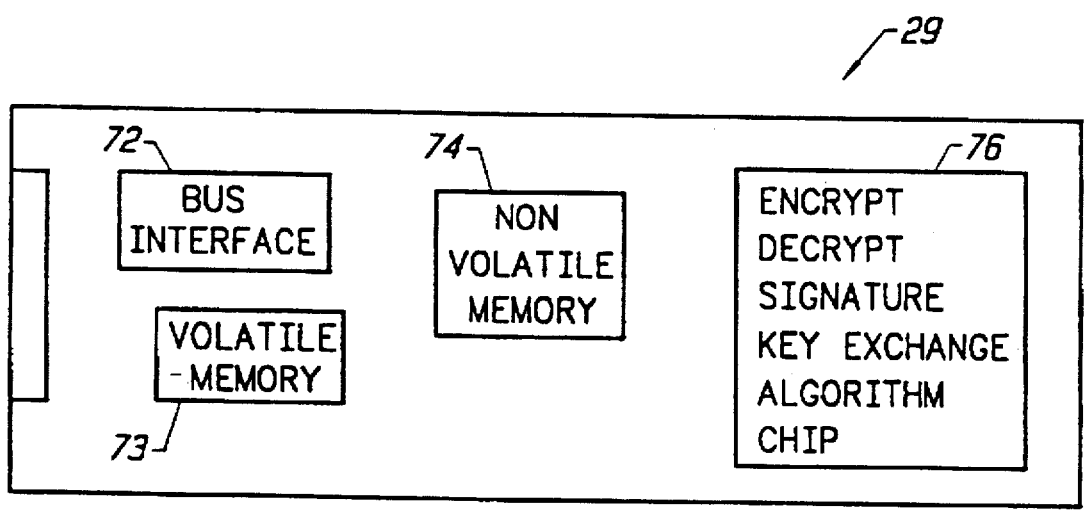
FIG. 12 is a block diagram of the subscriber's PCMCIA.

Turning to FIG. 11, many of the features shown in FIG. 2 are again shown, but in block diagram form. However, audit/decrypt device and call up application 71 are distinguished from the user's computer 31. This device can either be on the user's PCMCIA card 29 or can be separate hardware or software installed on the user's computer 31.

The user's PCMCIA card 29 includes a standard bus interface 72 and RAM 73. The non-volatile memory includes such features as described above, such as personalities and audit functions. The microprocessor 76 includes an encryption/decryption, signature, key exchange algorithm.

Figure 13:
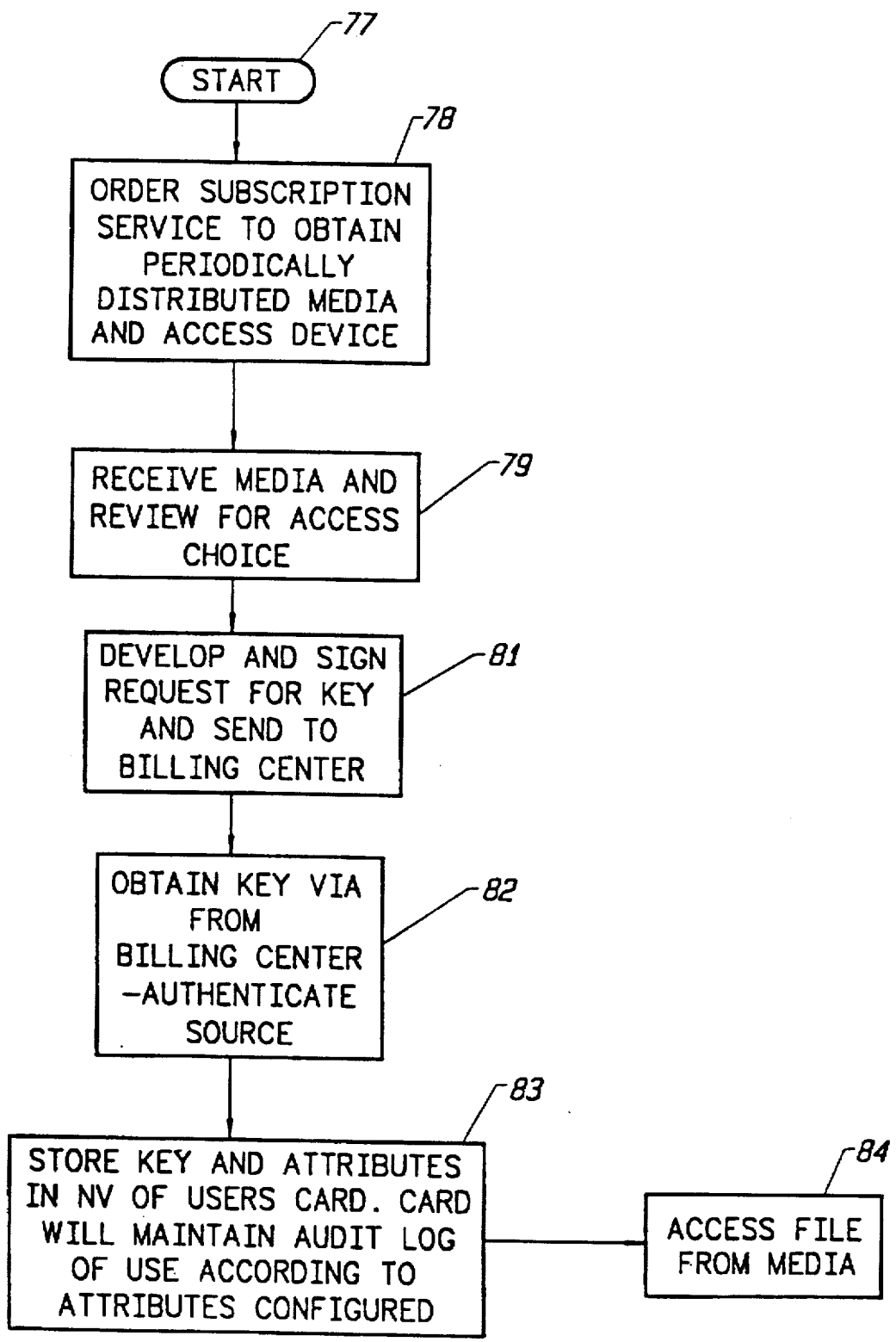
FIG. 13 is a flow chart of the subscriber's key request process.

The operation by the user of the features on the user's PCMCIA card 29 is shown in the flow chart of FIG. 13. After the start 77 of the sequence of events, in step 78 the user orders subscription service to obtain periodically distributed media. In step 79, the user receives the CD-ROM by, for example, mail and loads the card and the CD-ROM. On the user's computer screen, the user views information stored on the CD-ROM similar that shown FIG. 10. In step 81 the user develops and signs an electronic mail request for a key and sends it to the billing/access center. In step 82, after having been authenticated and authorized, the user obtains the key via e-mail from the billing/access center. In step 83, the key is stored on the user's PCMCIA card 29. The card further maintains an audit log of the user's activity according to the attributes configured. This audit can be accessed by the billing/access center remotely in order to monitor use for several purposes. For example, the use is audited to provide publishers information as to how many times, after a subscription is published, the user views the same publication. Finally, in step 84, the user accesses the file of choice.

Figure 14:
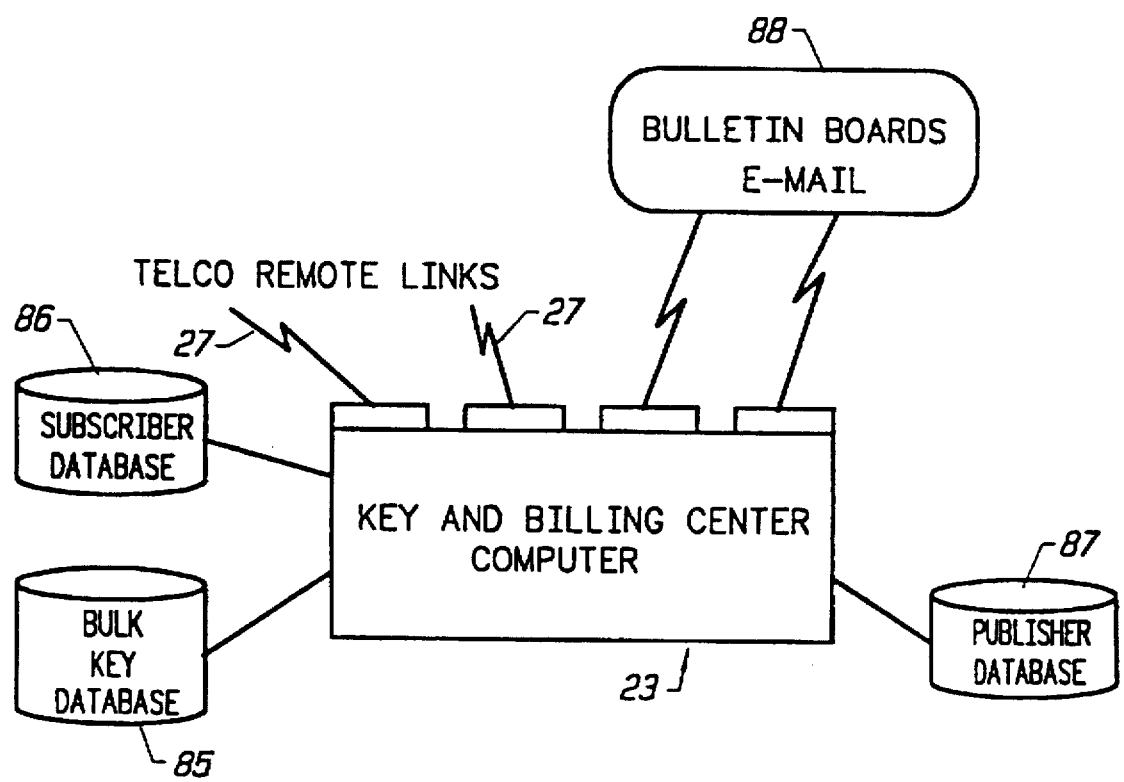
FIG. 14 is a block diagram of key data base and billing/access center.
Figure 15:
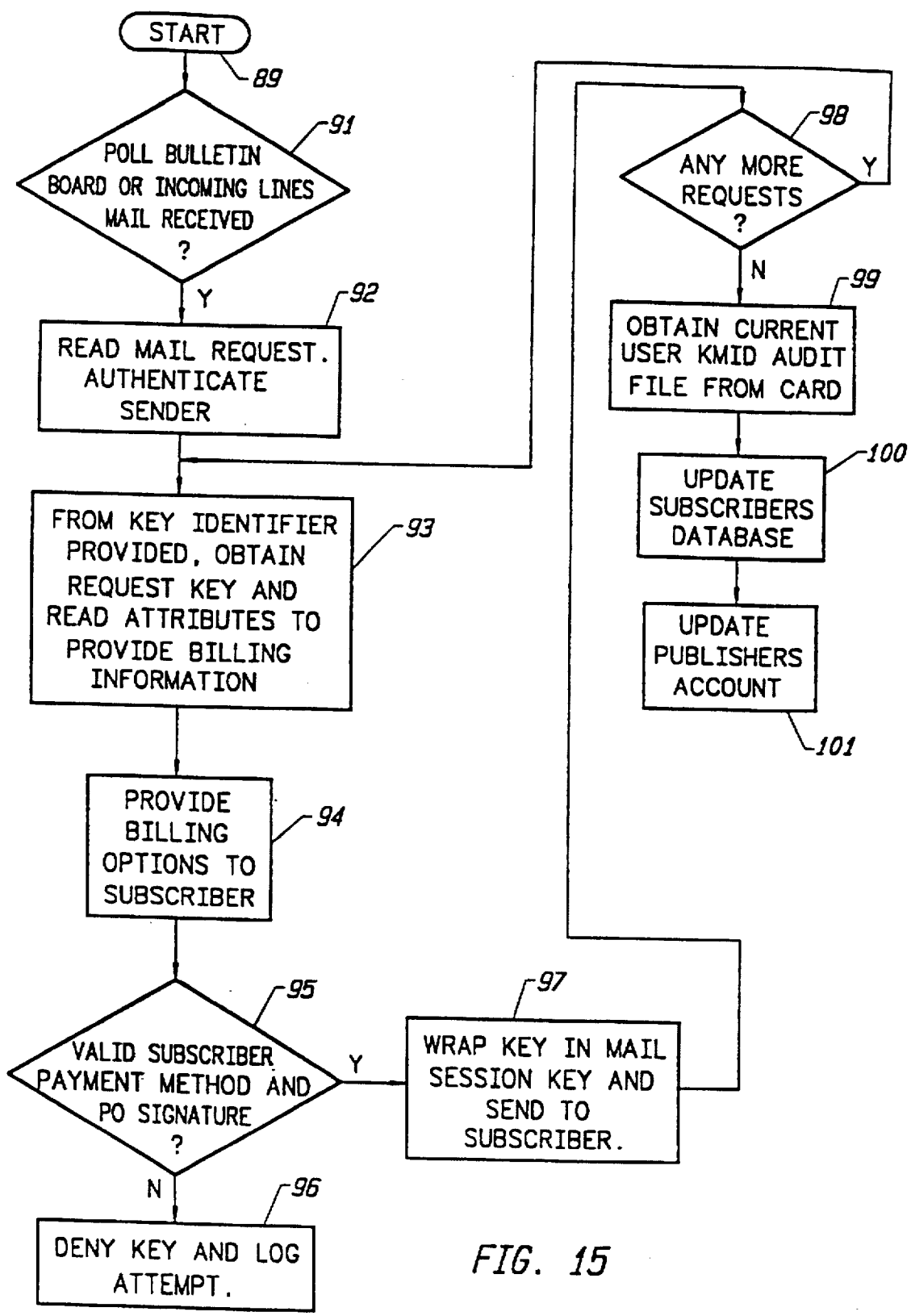
FIG. 15 is a flow chart of the billing/access center process.

Referring to FIG. 14, features of the billing/access center 23 are shown in block diagrams. Features already discussed include the remote links 27 to both the users and the publishers. Access to the key management system include modem for on-line access, telephone, electronic mail, bulletin boards and other access means. The bulk key data base 85 keeps keys to be distributed to the publishers for their use in encrypting data. The subscriber data base 86 includes lists of all subscribers and certain information about them obtained prior to or after their use of the system or through audits. The publisher data base 87 contains the publisher's use of the keys and their associated KMIDs as well as attributes. The bulletin board 88 holds messages which are incoming from subscribers and publishers. It is also available to send messages to both the publishers and the subscribers telling them of new features of the system or other information.

The billing/access center process starts 89 by polling the bulletin board or incoming call for incoming requests from subscribers. In step 92, the billing/access center reads the electronic request and authenticates the subscriber by checking the electronic signature of the message. In step 93, from the KMID provided by the request, it makes a match to the attributes to provide billing information. Optionally, the billing/access center can communicate with the user in step 94 to provide billing options to the user, such as time payments or offers not indicated on the CD-ROM menu. When the billing is settled, in step 95, the billing/access center validates the subscriber's payment method and receives a purchase order from the user. If the signature or the payment method are not satisfactory, the billing/access center denies the key and log attempt in step 96. If they are satisfactory, the key is downloaded to the user's PCMCIA card 29 in step 97. In step 98, the billing/access center queries for more requests. If there are none, it downloads-the audit file, obtains the current user KMID audit file from the card in step 99 and updates the subscribers database 97 and updates the publisher's account in steps 100 and 101 respectively. If the response is yes to the query of step 98, the system returns to step 93 and begins the process over again, but with respect to a different data file and KMID.

The billing/access center's communication with the user can be interactive as described above, or it can be configured so that it a request is sent and it is either approved or denied. In any event, the billing/access center receives the KMID and if authorization is achieved, the key is sent to the user to access the data stored on the CD-ROM.

As discussed briefly above, the cryptographic update process provides a way in which access to out-of-date information or issues released beyond a subscriber's time period is blocked. The cryptographic update process is yet another flag in the attribute data structure. The publisher of a monthly or bi-weekly periodical will publish a large amount of information regularly for what can be a very long period time (years). The publisher of periodicals will have subscribers to their service receiving this data. The subscriber joins and is downloaded with a key that is valid for a period of time that their subscription service is online. However, this puts the publisher in a very vulnerable position, if the same key is used for all encryption during the life of the publication. The objective of the remote cryptographic update process is to allow the publisher of a periodical to ship each periodical under a different encryption key each month without having to download a new key to their current set of subscribers.

Ideally, the publisher will distribute the information encrypted under a different key each month. This protects the publisher's information from an external attacker determining their key and obtaining all of their publications. However, this implies that a subscriber would be required to download a new key each month, for example. This may be very cumbersome to the subscriber. The system of the present invention defines the use of a user site cryptographic update that is applied to the current (or monthly) key to "generate" a new key based on the previous month's key. Since all cards understand the algorithm to be used for the update process, they derive the same key value. The publisher is aware of the algorithm and uses it to generate the updated key value for the encryption process. If a publisher puts out material monthly, they would perform a monthly "update" on the key for each new publication. When the subscriber obtains the new CD-ROM, an update counter of the CD-ROM or stored on the data storage unit tells the user's PCMCIA how many updates have been performed. The update counter is used to maintain synchronization between publisher and subscriber.

For example, turning to FIG. 16, there is shown a one year subscription service period to illustrate the cryptographic update process for subscription service where a periodic key provides updates to the instant key each publication. The twelve months are identified in column 106. Each month has a different key associated with it as shown in column 107, such indicated as $K_A$, $K_B$, and so on. "Subscriber One" indicated in column 108 is shown as having a six month subscription starting in the second month of the year. "Subscriber One" receives key $K_B$ to access the data distributed in the second month. The update process as described above updates key $K_B$ through a mathematical operation where the update process, U, acts on the previous month's key. For example, when U acts on $K_B$, $K_C$=$UK_B$. Moreover, when the CD for the third month of the subscription becomes available, U acts on $K_C$ so that $K_D$=$UK_C$=$UUK_B$. $K_D$ through $K_G$ are generated in the same manner. Thus, through the cryptographic update process of the present invention, "Subscriber One" receives a set of keys which operate to access the issues between month two and month seven. A different subscriber, "Subscriber Two" as indicate by column 109, also has a six month subscription, however, it begins in the fourth month and receives key $K_D$. The update process of the present invention updates key $K_D$ so that U acts on $K_D$, $K_E$=$UK_D$. Moreover, when the CD for the third month of the subscription becomes available, U acts on $K_D$ so that $K_F$=$UK_E$=$UUK_D$. $K_G$ through $K_I$ are generated in the same manner. Thus, while "Subscriber One" and "Subscriber Two" have their subscriptions during different time periods which overlap, they use the same keys to access the overlapping months through the update process. The process of the generation of the access codes from the initially downloaded key for access to a certain portion of the year's issues through a monthly update, allows the publisher to provide subscription service starting at different times and having different lengths, without providing access to more data than the authorized service. The KMID parameters define the number of updates purchased. In the example of FIG. 16, the KMID would define five (5) updates for both users.

Thus, the present invention includes a data retrieval system for use by a user which includes a server or a plurality of portable data storage means, such as CD-ROMs, wherein each of which includes data stored on certain ones of the plurality of CD-ROM, for example, issues of a particular publication which is sequentially distributed. Portions of the data on the server or the CD-ROMs is selected by the user which are accessible by a set of access codes (i.e., $K_B$ to $K_G$) which is part of a larger group of access codes (i.e., $K_A$ to $K_L$) wherein one of the set of access codes is a transmitted access code, such transmitted to said user by the billing/access center. To access previously unaccessible or unavailable data on a server or ones of the plurality of CD-ROMs, the server or CD-ROMs include a code which is cooperative with the transmitted access code for generating updated access codes for access to other data on the server or data on other certain ones of the plurality of CD-ROMs.

The update process uses the current key (the one used in the months of the publication). To this key a fixed an known constant is mathematically applied, for example, exclusive OR'd, to the current key. The resultant value from the mathematical operation is used as the decryption key for the next publication. All keys with update attributes are maintained with their update counter. This allows the user to synchronize their keys even if they missed one or two publications. This process occurs at the subscriber's site. The publisher performs the same functions and applies the same value to generate the new encryption key. The information is encrypted with the newly updated key. The encryption information and the update counter attribute, which is unencrypted, is recorded onto the server or CD-ROM for distribution.

In the claims:

1. A system for accessing data by a user, comprising:

a processor for processing said data;

a data storage unit for storing said data in a manner requiring different access code for accessing correspondingly different data stored on said storage unit by the user;

a controller in communication with said processor for receiving a signal representative of one of said different access codes from a remote location and for sending a signal which enables access by said processor means to a selected portion of said data on said storage unit using one of said access codes;

a remote authorization unit located at a location remote from said processor and said controller, said remote authorization unit for transmitting an access code to said controller from said remote location in response to an authorization request signal sent by the user to said remote authorization unit; and wherein said data storage unit stores update means cooperative with said transmitted access code for automatically generating updated access codes for access to previously unaccessible parts of said data storage unit when electronic update counter conditions are met.

2. A system as recited in claim 1 wherein said updated access codes are generated by said controller.

3. A system as recited in claim 1 wherein each of said access codes is correlated with an identifying code and wherein said authorization request includes said identifying code.

4. A system as recited in claim 3 wherein said identifying code is representative of an attribute.

5. A system as recited in claim 4 wherein said attribute is representative of a use of said data.

6. A system as recited in claim 1 wherein said controller is a hardware configuration.

7. A system as recited in claim 1 wherein said controller is a software configuration.

8. A system as recited in claim 1 wherein said data stored on said data storage unit includes identifying codes for identifying said data.

9. A system as recited in claim 8 wherein said identifying codes are codes are associated with attributes.

10. A system as recited in claim 9 wherein said attribute is representative of use of said data.

11. A system as recited in claim 8 wherein said authorization request includes one of said identifying codes.

12. A method for distributing data to a user comprising the steps of:
- on a storage unit, providing encrypted data, such requiring an access code to decrypt said data to provide access thereto wherein a least a portion of said encrypted data is correlated with a corresponding access code identifier for identifying access codes;
- at a remote location, storing a plurality of access codes together with corresponding access code identifiers;
- at a remote location, generating an authorization signal when particular conditions are met, wherein said authorization signal causes one of said access codes to be transmitted to said user to enable said user to access a portion of said encrypted data by decrypting a portion of said encrypted data and wherein said access conditions include the receipt of one of said access code identifiers from said user;
- applying said access code to said encrypted data to decrypt a portion of said encrypted data; and
- processing said decrypted portion of said encrypted data.

13. A method as recited in claim 12 wherein on said data storage unit, update means are stored, such cooperative with said one transmitted access code for generating updated access codes for access to previously unaccessible parts of said data on said data storage unit.

14. A method as recited in claim 13 wherein said updated access codes are generated by a controller.

15. A method as recited in claim 12 wherein said authorization signal is generated in response to an authorization request by said user, such including said access code identifier.

16. A method as recited in claim 12 wherein said access code identifier is representative of an attribute.

17. A method as recited in claim 16 wherein said attribute is representative of use of said data.

18. A method as recited in claim 12 wherein said applying step is carried out by hardware configuration.

19. A method as recited in claim 12 wherein said applying step is carried out by software configuration.

20. A method as recited in claim 12 wherein said data stored on said data storage unit include identifying codes-associated with different portions of said data.

21. A method as recited in claim 20 wherein said identifying codes are correlated with attributes.

22. A method as recited in claim 21 wherein said attributes are representative of use of said data.

23. A method of distributing information in the form of data sets and providing access thereto, comprising the steps of:
- encrypting said data sets so that different access codes are required to decrypt different portions of said data sets;
- correlating said data sets with access code identifiers which identify particular access codes which will decrypt said data sets;
- writing said data sets on a data storage unit;
- providing a data storage controller which is capable of applying said access codes to said data storage means;
- remotely providing a data access controller with one of said different access codes to decrypt a selected one of said encrypted data sets in response to the receipt of one of said access code identifiers;
- said data access controller accessing said data sets written onto said data storage means; and
- wherein said access codes are further stored with attributes defined in a manner which corresponds to particular properties of said data sets, both of which are transmitted to said data access controller in response to the receipt of one of said access code identifiers.

24. A method as recited in claim 23 wherein said data storage unit stores update means cooperative with said access codes for generating updated access codes for access to previously unaccessible parts of said data on said data storage unit.

25. A method as recited in claim 24 wherein said updated access codes are generated by said controller.

26. A method as recited in claim 23 wherein said attributes are representative of use of said data.

27. A system for encrypting data, comprising:
- a memory medium including programming codes stored thereon for encrypting individual data sets and for assigning access code identifiers to said individual data sets, each of said access code identifiers associated with and used in identifying a particular access code for decrypting one of said individual data sets, said access code identifier for identifying said particular access code;
- a processor in communication with said memory medium for writing said encrypted individual data sets to a data storage unit so that at least some of said individual data sets are stored in conjunction with access code identifiers on said data storage unit; and
- a remote access code distribution controller for transferring a particular one of said access codes for use with a particular one of said portable data storage means on receipt of one of said access code identifiers from a second location.

28. A system as recited in claim 27 wherein said data storage unit stores update means which are cooperative with said access codes for generating updated access codes for access to previously unaccessible parts of said data on said data storage unit.

29. A system as recited in claim 27 wherein said access code is further associated with an attribute.

30. A system as recited in claim 29 wherein said attribute is representative of use of said data set.

31. A method for encrypting data sets to control access thereto, comprising the steps of:
- defining attributes in a manner which corresponds to particular properties of said data sets;
- binding said attributes to access codes and storing them in a first location;
- encoding said data sets so they may be decrypted by said access codes when said access codes signal are applied to said data sets by a processor;

storing said encoded data sets on a data storage unit;

transmitting to a second location from said first location one of said access codes bound to one of said attributes.

32. A method as recited in claim 31 wherein said attributes are representative of a use of said data.

33. A method as recited in claim 31 wherein said access codes are correlated with identifying codes.

34. A method as recited in claim 31 wherein access to said encoded data sets of said data storage unit is provided by a remote authorization center and further comprises the step of:

providing a controller for communication with said data storage unit and wherein, upon transmitting one of said identifying codes to said remote authorization center, one of said access codes is downloaded to said controller wherein said controller provides access to said data sets stored on said data storage unit.

35. A method as recited in claim 34 wherein said controller is provided in a hardware configuration.

36. A method as recited in claim 34 wherein said controller is provided in a software configuration.

37. A method as recited in claim 34 wherein said data storage unit stores thereon means cooperative with access codes for generating updated access codes for access to previously unaccessible parts of said data stored on said data storage unit.

38. A data retrieval system-for use by a user comprising:

a data storage unit including data stored thereon including portions selected by said user, said selected portions on said data storage unit being accessible by a set of access codes, wherein one of said set of access codes is transmitted by a remote central processing unit to a user at a different location, such transmitted to said user to provide access to said selected portions of said data stored on said data storage unit; and wherein said data storage unit includes update means cooperative with said transmitted access codes for automatically generating updated access codes for access to previously unaccessible parts of said selected portions of said data on said data storage unit when electronic update counter conditions are met.

39. A system as recited in claim 38 wherein each of said access codes is correlated with an identifying code and wherein said authorization request includes said identifying code.

40. A system as recited in claim 39 wherein said identifying code is representative of an attribute.

41. A system as recited in claim 40 wherein said attribute is representative of a use of said data.

42. A system as recited in claim 38 wherein said data stored on said data storage unit includes identifying codes for identifying said data.

43. A system as recited in claim 42 wherein said identifying codes are codes are associated with attributes.

44. A system as recited in claim 43 wherein said attribute is representative of use of said data.

45. A system for providing authentication of electronic transmissions, comprising:

an authorization center for transmitting access codes to different locations upon receipt of authenticated requests for said access codes, wherein one of said access codes is electronically transmitted to a different location when said authenticated request meets particular electronic signature conditions; and a controller at said different location for receiving said access codes from said authorization Center, said controller capable of verifying that said access code was transmitted from said remote authorization center.

46. A system as recited in claim 45 wherein said access codes provide for the decryption of encrypted data stored on a data storage unit.

47. A system as recited in claim 46 wherein on said data storage unit, update means are stored, such being cooperative with said one transmitted access code for generating updated access codes for access to previously unaccessible parts of said data on said data storage unit.

48. A system as recited in claim 45 wherein said access codes are correlated with an identifying code and wherein said authenticated request includes said identifying code.

49. A system as recited in claim 48 wherein said identifying code is representative of an attribute.

50. A system as recited in claim 49 wherein said attribute is representative of a use of said data.

51. A system as recited in claim 45 wherein said controller is a hardware configuration.

52. A system as recited in claim 45 wherein said controller is a software configuration.

53. A system as recited in claim 46 wherein said data stored on said data storage unit includes identifying codes for identifying said data.

54. A system as recited in claim 53 wherein said identifying codes are codes are associated with attributes.

55. A system as recited in claim 54 wherein said attribute is representative of use of said data.

56. A method for providing authentication of electronic transmissions, comprising the steps of:

providing an authorization center for transmitting access codes to different locations upon receipt of authenticated requests for said access codes, wherein one of said access codes is electronically transmitted to a different location when said authenticated request meets particular electronic signature conditions; and providing a controller at said different location for receiving said access codes from said authorization center, said controller capable of verifying that said access code was transmitted from said remote authorization center.

57. A method as recited in claim 56 wherein said access codes provide for the decryption of encrypted data stored on a data storage unit.

58. A method as recited in claim 57 wherein on said data storage unit, update means are stored, such being cooperative with said one transmitted access code for generating updated access codes for access to previously unaccessible parts of said data on said data storage unit.

59. A method as recited in claim 56 wherein said access codes are correlated with an identifying code and wherein said authenticated request includes said identifying code.

60. A method as recited in claim 59 wherein said identifying code is representative of an attribute.

61. A method as recited in claim 60 wherein said attribute is representative of a use of said data.

62. A method as recited in claim 56 wherein said controller is a hardware configuration.

63. A method as recited in claim 56 wherein said controller is a software configuration.

64. A method as recited in claim 56 wherein said data stored on said data storage unit includes identifying codes for identifying said data.

65. A method as recited in claim 64 wherein said identifying codes are codes are associated with attributes.

66. A method as recited in claim 66 wherein said attribute is representative of use of said data.

* * * * *